L. S. THOMPSON.
ANTISKID DEVICE.
APPLICATION FILED JAN. 2, 1912.

1,027,450.

Patented May 28, 1912.

Attest:
B. B. Newton
S. J. Cox

Langdon S. Thompson, Inventor:
by William R. Baird,
his Atty.

UNITED STATES PATENT OFFICE.

LANGDON S. THOMPSON, OF JERSEY CITY, NEW JERSEY.

ANTISKID DEVICE.

1,027,450.      Specification of Letters Patent.      Patented May 28, 1912.

Application filed January 2, 1912. Serial No. 668,902.

*To all whom it may concern:*

Be it known that I, LANGDON S. THOMPSON, a citizen of the United States, residing at Jersey City, in the county of Hudson and State of New Jersey, have invented certain new and useful Improvements in Antiskid Devices, of which the following is a specification.

This invention relates to anti-skid devices for automobile tires and the like and its novelty consists in the construction and adaptation of the parts as will be more fully hereinafter pointed out.

The chain systems commonly employed for this purpose have several disadvantages. One is the large number of joints making as many points of weakness; a second is the tendency of a chain to break and become loose at one end, thereafter tapping against the mud guard of the vehicle until taken up or removed; a third is the number of places liable to deterioration and repair under usual conditions of use; and another, and most important, is that the presence of a chain does not prevent, or materially lessen, the tendency to side slip or lateral skidding, especially when the vehicle is traveling on a highway with a relatively high crowned road surface.

My invention has for its object the overcoming of the disadvantages referred to and to that end it is so constructed that it has comparatively few parts and joints and corrects the tendency to side skidding.

Figure 5:
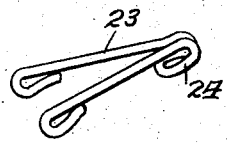
Figure 6:
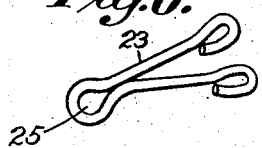
Figure 1:
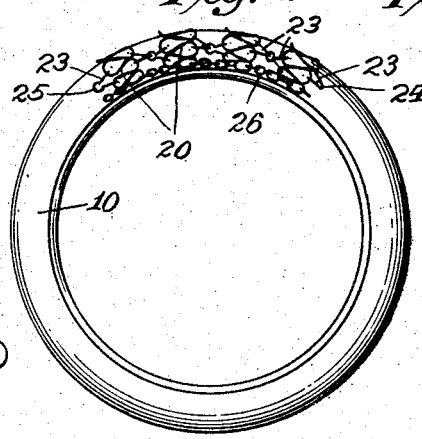
Figure 7:
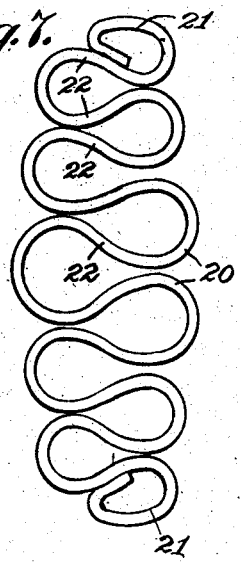
Figure 2:
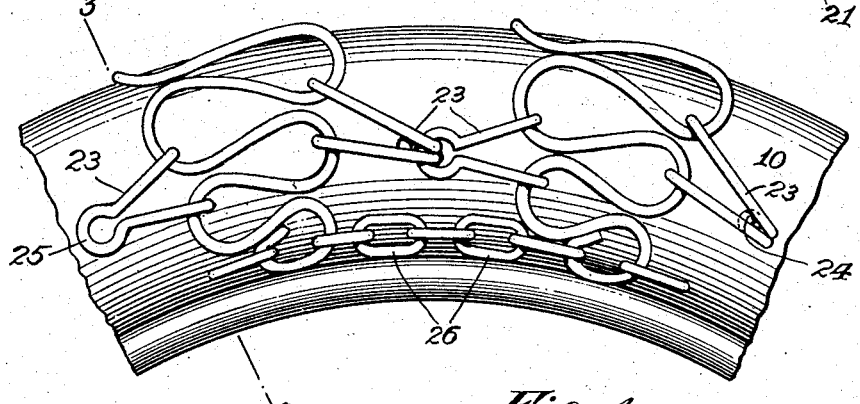
Figure 3:
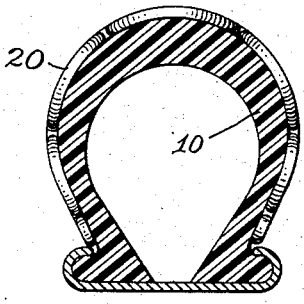
Figure 4:
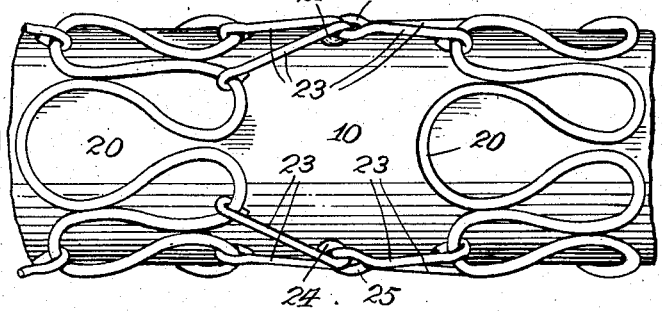

In the drawing, Figure 1 is a miniature view of a tire showing a device embodying my invention applied to a portion of its surface; Fig. 2 is a side elevation of a portion of a tire to which the invention has been applied; Fig. 3 is a section on the plane of the line 3—3 in Fig. 2; Fig. 4 is a plan view of the parts shown in Fig. 2; Figs. 5 and 6 are perspective views of the links; and Fig. 7 is a plan of the band.

In the drawings, 10 is an automobile tire of usual form. 20 is a band made preferably of flexible metal and formed of a series of loops alternately reversed, one with respect to the other and gradually increasing in width from each end of the band considered as a whole toward the middle, forming in effect a multiple reversed band of joined reversed and uncrossed loops, the band being provided at each side with terminal ears designated by 21. It will be noted that this band is made of essentially a single continuous piece of metal without joints or interruptions, and that it is bent into wide curves 22 preferably circular in outline and without straight portions running transversely across the tire but having sections or portions disposed in a general longitudinal direction which counteract the tendency to side skidding.

The multiple bands 20 are arranged at suitable intervals around the tire and are connected together by any suitable means. I prefer, however, to use links 23 of a specific form, each composed of a single piece of metal having hooked extremities designed to engage one or more of the loops of each band and at the opposite end of the links bent into shape to form a hook 24 and eye 25. This connecting means may be supplanted by or supplemented by sections of chain 26 connecting the ears 21 of the bands 20.

What I claim as new is:

1. An anti-skid device for automobile tires and the like, comprising a series of multiple reversed loop bands arranged around the tire and connected together by intermediate links.

2. An anti-skid device for automobile tires comprising a series of bands adapted to transversely encircle the tire each band comprising a plurality of loops extending from side to side of the band alternately reversed in position.

3. An anti-skid device for automobile tires and the like, comprising a series of multiple reversed loop bands arranged around the tire, each band terminating in a ring-like loop on each side, the successive bands being connected together by chain members engaging the loops.

4. An anti-skid device for automobile tires comprising a series of bands adapted to transversely encircle the tire each band comprising a plurality of loops extending from side to side of the band alternately reversed in position and each band terminating in a ring like loop, and links connecting the loops of adjacent bands.

5. A band for an anti-skid device comprising a series of multiple curved loops, each loop being reversed with respect to the one next to it, and the loops gradually decreasing in size from the middle toward each end of the band.

6. A band for an anti-skid device comprising a series of multiple curved loops, each loop being reversed with respect to the one next to it and being formed of substantially circular arcs.

7. A band for an anti-skid device comprising a series of multiple curved loops, each loop being reversed with respect to the one next to it and being formed of substantially circular arcs, and the loops gradually decreasing in size from the middle toward each end of the band.

8. An anti-skid device for automobile tires comprising bands made up of a series of alternately reversed loops formed in circular arcs, and which bands are connected together around the tire by intermediate links.

9. An anti-skid device for automobile tires comprising bands made up of a series of alternately reversed circularly curved loops gradually decreasing in width from the middle toward each end of the band, and which bands are connected together around the tire by intermediate links.

In testimony whereof I affix my signature in presence of two witnesses.

LANGDON S. THOMPSON.

Witnesses:
E. W. SCHERR, Jr.,
S. S. NEWLON.